US006952718B2

(12) United States Patent
Nakamura et al.

(10) Patent No.: US 6,952,718 B2
(45) Date of Patent: Oct. 4, 2005

(54) METHOD, SYSTEM, STORAGE MEDIUM AND SERVER APPARATUS FOR CONTROLLING WORKFLOW

(75) Inventors: Yuhichi Nakamura, Yokohama (JP); Ryoh Neyama, Zama (JP); Naishin Seki, Yokohama (JP); Kohichi Kajitani, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 09/749,230

(22) Filed: Dec. 27, 2000

(65) Prior Publication Data

US 2001/0027477 A1 Oct. 4, 2001

(30) Foreign Application Priority Data

Dec. 27, 1999 (JP) .......................................... 11-369919

(51) Int. Cl.[7] .............................................. G06F 15/16
(52) U.S. Cl. ...................... 709/205; 709/203; 709/204; 705/9; 715/751
(58) Field of Search ............................... 709/204–208, 709/203, 217; 705/7–9

(56) References Cited

U.S. PATENT DOCUMENTS 4,503,499 A * 3/1985 Mason et al. ............... 718/101
5,557,780 A * 9/1996 Edwards et al. ............. 703/27
5,754,857 A * 5/1998 Gadol ......................... 709/203
6,047,264 A * 4/2000 Fisher et al. ................ 705/26
6,170,002 B1 * 1/2001 Ouchi ......................... 709/206
6,327,611 B1 * 12/2001 Everingham ................ 709/206
2002/0013731 A1 * 1/2002 Bright et al. ................ 705/22

* cited by examiner

Primary Examiner—Glenton B. Burgess
Assistant Examiner—Yasin Barqadle
(74) Attorney, Agent, or Firm—Stephen C. Kaufman; David Aker

(57) ABSTRACT

Flow control for a workflow controlling system is achieved wherein a business document flows among a plurality of participants by, at a system which includes a server apparatus including a storage device and terminal apparatus connecting to the server apparatus via a network, generating a document which includes data and rules responding to a request from one of the terminal apparatus and storing it in the storage device, receiving an update request on the document from the first terminal apparatus, determining whether the update request is appropriate or not, and if the update request is appropriate then executing the update on the document, and determining whether the workflow/process was completed or not, and if not completed then identifying the second terminal apparatus which can update next and notifying it.

34 Claims, 15 Drawing Sheets

Operation of a flow control section

Typical inter-company workflow

Overview of a workflow controlling system

Structure of a flow control section

Workflow including a bid from a forwarder

```
Contents
    Tree structure
    (Node, [value])
History
    (Time, person, action, node ID)
Access Control
    (Node ID, tag name, person, role, action, conditional expression)
Constrains
    (Conditional expression)
Dependencies
    (Depended node ID, Dependent node ID)
Termination
    (Type, conditional expression)
    Type . End or Abort
```

[A]   means that A is optional

Document data structure

Fig. 6

```
Contents                              History
    OrderID= "00001"                      14/Sep/1999·15:20:10,Runtime,w,OrderID
    Consumer                              14/Sep/1999:15:22:20,Neyama,w,ConsumerID
        ConsumerID= "ConsumerA"                      ⋮
        Name= "Neyama"
        Address= "Yamato-shi"             14/Sep/1999.16:37.10,Pelican,cr,Candidate#0
        Phone= "042-123-4567"             14/Sep/1999:16:37 20,Pelican,w,Candidate#0
        DeliveryDateRequested= "21/Sep/1999"
    Product                           Access Control
        ProductID= "IBM Aptiva"           value(ConsumerID),w,Specified
        Price= "99,800 yen"               Transport,cr,Candidate#?,(value(Specified)=nil)
        UnitID= "9 116 54.89"
    Supplier                          Constraints
        SupplierID= "IBM Corp "           value(DeliveryDateOffer) <= value(DeliveryDateRequested)
    Transport                             timeout(isFilled(Specified),isFilled(DeliveryDateRequested),(130)
        Specified= "Kuroneko"
        Candidate#0= "Pelican"        Dependencies
            DeliveryDateOffered= "21/Sep/1999"    ConsumerID, OrderID
        Candidate#1= "Kuroneko"           Candidate#?, DeliveryDateRequested
            DeliveryDateOffered= "20/Sep/1999"
                                      Termination
            ⋮                             End
                                              value(Specified) ! nil
                                          Abort
                                              ProductID, cn
                                              time(Specified, w) > time(DeliveryDateRequested) +
```

Example of a document

Fig. 7

Processing flow among modules (1)

Processing flow among modules (2)

Structure of contents

| | Node ID (Attribute name) | Parent node ID (Attribute name) | Value |
|---|---|---|---|
| T0 | / | nil | nil |
| T1 | /document | / | nil |
| T2 | /document/contents | /document | nil |
| T3 | /document/contents/OrderID | /document/contents | 00001 |
| T4 | /document/contents/Consumer | /document/contents | nil |
| T5 | /document/contents/Consumer/ConsumerID | /document/contents/Consumer | Neyama |
| T6 | /document/contents/Consumer/ConsumerID/Name | /document/contents/Consumer | Ryoh Neyama |
| T7 | /document/contents/Consumer/ConsumerID/Address | /document/contents/Consumer | Yamato-shi |
| T8 | /document/contents/Consumer/ConsumerID/Phone | /document/contents/Consumer | 046-123-4567 |

Representation of a tree structure of contents as a table

Fig. 12

| Order | Time (sec) | Writer ID | Action | Node ID |
|---|---|---|---|---|
| 0 | 0 | Runtime | Write | /document/contents/OrderID |
| 1 | 100 | Neyama | Write | /document/contents/Consumer/ConsumerID |
| 2 | 100 | Neyama | Write | /document/contents/Consumer/Name |
| 3 | 100 | Neyama | Write | /document/contents/Consumer/Address |
| 4 | 100 | Neyama | Write | /document/contents/Consumer/Phone |

(Action types : Create, Write, Read, Cancel)

Example of History representation

Fig. 13

```
Outline part format
    allow( <node>,<user>,<operation>)

Example of rules
    Rule 1
        allow( ?Node, ?User, "+w") <--
            isPath( ?Node, "/document") and
            hasRole( ?User, "Consumer").

Rule 2
        allow( ?Node, ?User, "+w") <--
            isPath( ?Node, "/ProductID") and
            hasRole( ?User, "Consumer") and
            isCreator( ?User, ?Node).
```

Example of Access Control representation

Fig. 14

```
Constraints 1
    Contents : member( TransportSpecified, CompanyID )
    Internal representation :
        getValue('TransportsSpecified',V1) and
        getValueList('CompanyID',V2) and
        member( V1, V2 )
Constraints 2
    Contents : DeliveryDateOffered <= DeliveryDateRequested
    Internal representation :
        getValue('DeliveryDateRequested',V1) and
        getValue('DeliveryDateOffered',V2) and
        V1 <= V2
```

Example of Constraints representation

Fig. 15

| Depended node ID | Dependent node ID |
|---|---|
| ProductID | UnitID |
| UnitID | TransportInfo |
| TransportInfo | TransportSpecified |

Example of Dependencies representation

Fig. 16

Example of Termination representation

End determination

Abort determination

Processing for finding all elements

Details of execution of an update request

Details of update processing

Processing for finding dependent nodes

Details of registration and deletion of time out

Processing after time out registration and occurrence

METHOD, SYSTEM, STORAGE MEDIUM AND SERVER APPARATUS FOR CONTROLLING WORKFLOW

DESCRIPTION

1. Field of the Invention

The present invention relates to a workflow controlling system in which documents flow among a plurality of participants, in particular covering a flow control section that is a central component thereof.

2. Related Art

FIG. 2 shows an example of a typical inter-company workflow that is a subject of the present invention. First, a customer makes an order request (201), and a seller requests a product supplier to reserve a specific product unit and receives the response (202, 203). Next, the customer is informed of whether the reservation is confirmed or not (204), and then arranges forwarding with a forwarder (205). Subsequently, the forwarder advises the customer of a forwarding date (206), and notifies the seller when the forwarding is completed (207).

When developing an application based on such a workflow, in the case of the conventional method, an application developer would define individual documents as data, and explicitly described in a program as to the order in which these documents flow among participants. For instance, a document for ordering, a document for checking a card number, a document for a forwarding request and so on are defined, and it is descriptively programmed that they flow in order of a customer, a seller, a product supplier and a forwarder (For instance, "FormWave," a product of IBM Japan Ltd. ("FormWave" is a trademark of International Business Machines Corporation)). And control of a flow was implemented, following such an explicit flow of documents, by managing the flow of documents while checking whether notices to participants and input information are in consistency with constraints.

In the conventional method explicitly describing a flow of documents, a flow can be correctly represented while description may become complicated. Especially, where it is not necessary to fix a flow of documents in advance (or not desired to do so), quite a few kinds of paths exist, and it is not realistic to represent them individually. For instance, while FIG. 2 represents a series of flows starting from a customer, a number of variations become possible by eliminating these flows here. Namely, an entirely different flow is possible, wherein a forwarder first provides services and a customer specifies a product and then places an order thereof. This shows that various business processes can be implemented by keeping the flows unfixed. To cope with such variations, however, descriptions corresponding to each of them must be prepared and so they become complicated.

SUMMARY

Thus, an object to be attained by the present invention is, in the light of the above-mentioned problems of the background art, to provide a new means for controlling flows as to a workflow controlling system in which documents flow among a plurality of participants.

Another object to be attained by the present invention is to provide a workflow controlling system or the like capable of flexibly addressing changes of workflows in addition to supporting fixed workflows.

Moreover, it is insufficient merely to passively accept input from participants, in the sense that they do not know when to input. Namely, it is not realistic since they always have to do polling. Thus, a further object to be attained by the present invention is to provide a facility for appropriately notifying the participants, according to a state of a document, that they should input.

A still further object to be attained by the present invention is to, in the case of cancellation of a request, notify resetting of fields resulting therefrom so that an appropriate process will be subsequently executed.

The present invention attains these objects by, at a system which includes a server apparatus including a storage device and terminal apparatus connecting to the server apparatus via a network, a method for controlling a workflow which is executed by the server, comprising the steps of generating a document which includes data and rules responding to a request from one of the terminal apparatus and storing it in the storage device, receiving an update request on the document from the first terminal apparatus, determining whether the update request is appropriate or not, and if the update request is appropriate then executing the update on the document, and determining whether the workflow/process was completed or not, and if not completed then identifying the second terminal apparatus which can update next and notifying it.

The present invention attains these objects by, at a system which includes a server apparatus and terminal apparatus connecting to the server apparatus via a network, a method for controlling a workflow which is executed by the server, comprising the steps of generating a document which includes data and rules responding to a request from the terminal apparatus and storing it, receiving an update request on the document from the first terminal apparatus, determining whether the update request is appropriate or not, and if the update request is appropriate then executing the update on the document on a storage medium, and determining whether or not the update request is a cancellation request, and if it is, resetting any field related to the cancellation request, and identifying a terminal apparatus related to the reset field to notify it.

The present invention attains these objects by, at a system which includes a server apparatus including a storage device and a flow control section and terminal apparatus connecting to the server apparatus via a network, the flow control section executing the functions of generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether processing of the document was completed or not, and if not completed then identifying the second terminal apparatus which can update next and notifying it.

The present invention attains these objects by, at a system which includes a server apparatus including a storage device and a flow control section and terminal apparatus connecting to the server apparatus via a network, the flow control section executing the functions of generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether or not the update request is a cancellation request, and if it is, resetting any field related to the cancellation request, and identifying a terminal apparatus related to the reset field to notify it.

The present invention attains these objects by, at system which includes a server apparatus including a storage device and terminal apparatus connecting to the server apparatus via a network, a computer readable storage medium storing a program for controlling a workflow used on the server, the program having the server execute the functions of generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database and determining whether processing of the document was completed or not, and if not completed then identifying the second terminal apparatus which can update next and notifying it.

In addition, the present invention attains these objects by, at a system which includes a server apparatus including a storage device and terminal apparatus connecting to the server apparatus via a network, a computer readable storage medium storing a program for controlling a workflow used on the server, the program having the server execute the functions of generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether or not the update request is a cancellation request, and if it is, resetting any field related to the cancellation request, and identifying a terminal apparatus related to the reset field to notify it.

Moreover, the present invention attains these objects by a server apparatus including a storage device and a flow control section connecting to terminal apparatus via a network, the flow control section executing the workflow controlling functions of generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether processing of the document was completed or not, and if not completed then identifying the second terminal apparatus which can update next and notifying it.

Furthermore, the present invention attains these objects by a server apparatus including a storage device and a flow control section connecting to terminal apparatus via a network, the flow control section executing the workflow controlling functions of generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether or not the update request is a cancellation request, and if it is, resetting any field related to the cancellation request, and identifying a terminal apparatus related to the reset field to notify it.

In addition, the present invention attains these objects by a server apparatus including a storage device and a flow control section connecting to terminal apparatus via a network, the flow control section having the means of, generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether processing of the document was completed or not, and if not completed then identifying the second terminal apparatus which can update next and notifying it.

Furthermore, the present invention attains these objects by a server apparatus including a storage device and a flow control section connecting to terminal apparatus via a network, the flow control section having the means of, generating a document which includes data and rules responding to a request from the terminal apparatus and storing it in a storage device, receiving an update request on the document from the first terminal apparatus, determining whether the update request is appropriate or not, and if the update request is appropriate then executing the update on the document on a database, and determining whether or not the update request is a cancellation request, and if it is, resetting any field related to the cancellation request, and identifying a terminal apparatus related to the reset field to notify it.

BRIEF DESCRIPTION OF THE DRAWINGS

FIG. 6 is a diagram showing structure of document data.

FIG. 7 is a diagram showing an example of a document.

FIG. 12 is a diagram representing a tree structure of contents as a table.

FIG. 13 is a diagram showing an example of History representation.

FIG. 14 is a diagram showing an example of Access Control representation.

FIG. 15 is a diagram showing an example of Constraints representation.

FIG. 16 is a diagram showing an example of Dependencies representation.

Figure 1:
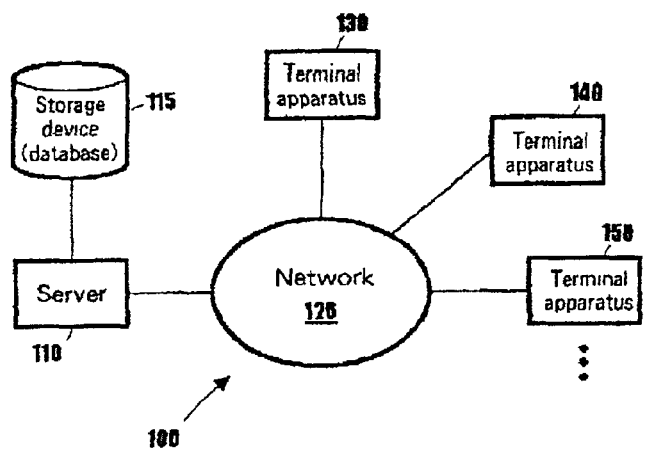
FIG. 1 is a diagram showing structure of the present invention.

DESCRIPTION OF THE PREFERRED EMBODIMENTS 4.1 Outline of the Invention

The present invention provides a method of using a declarative description for describing a flow so as to keep it unfixed. As mentioned later, this method takes an approach wherein a document including every field appearing in a series of flows is defined as logical including data and rules, and constraints on fields therein are described. Thus, participants can make any change at any time as long as the constraints are met, and consequently various flows become possible, and besides, any change of a workflow definition can be flexibly handled.

Namely, as mentioned above, while the conventional method by descriptive programming describes flows of documents themselves explicitly by a program, the present invention covers a method wherein a declarative description including data and rules is converted into a logic program, as to constraints on fields in a document or dependencies among fields, so as to dynamically control flows. A method based on a declarative description like the present invention allows a flexible description, and yet it requires by any means a facility to determine whom, when and of what to notify in order to make it realistic. In the following embodiment, the three kinds of notifying functions are provided as follows to solve such a problem:

1. A function to notify necessity of input when required;
2. A function to notify a reset of a field caused by cancellation;
3. A function to, triggered by time out, notify necessity of input or an end of processing. The functions as above are implemented by utilizing a frame of logic programming (logic program).

Here, logic programming refers to the forms of programming by utilizing a concept of a "relation" instead of a concept of a "function" that is central in ordinary functional programming (for instance, C, Lisp, Pascal, etc.). A "function" is defined as follows, as what derives output from given (plurality of) input.

F(in1, in2, in3, . . . )->out

On the other hand, a "relation" does not differentiate input from output but only provides arguments.

R(p1, p2, p3, . . . )

(For reference purposes, a table of relational databases is also based on the same concept.) Thus, even if utilizing an identical relation, different kinds of queries are possible depending on arguments to be provided. For instance, in the case of parent, a relation representing parentage is considered, a question of which input is a parent and output is a child and a question of which input is a child and output is a parent are possible.

The actual programming forms of logic programming are described by utilizing variables (starting with ?) and logical operators (and, or, <–) that are used in relations and arguments. For instance, a rule representing a descendent relation is as follows.

ancestor(?A, ?D)<–parent (?A, ?D).

ancestor(?A, ?D)<–parent (?A, ?C), ancestor(?C, ?D).

It means that, for A to be an ancestor of D, either A must be a parent of D or C, namely a child of A must be an ancestor of D. (The rules and description method of logic programs in the present invention also comply with this.)

A logic program is executed by providing a goal as input. A goal is what is represented as follows by relations and arguments.

Relation name (argument 1, argument 2, argument 3, . . . )

Compared to execution of a function, execution of a goal is characterized as follows.

If a goal is executed, a true or false value of the goal is returned as an execution result (no specific value is returned).

Not only a specific value but also a variable can be specified as an argument.

If a variable is specified as an argument, a specific value assigned to the variable when a goal is successful (when it is true).

Moreover, while a functional programming language is executed by providing information such as a function name (argument 1, argument 2, . . . ), it is different from a logic program in that every argument is a specific value and a specific value is returned as output of a function.

The present invention also utilizes the above-mentioned characteristic of "no differentiation between input and output" of logic programming. Namely, a policy is described from a viewpoint of determining whether a request for change from a participant is appropriate or not, and utilizing it, a participant to be notified next is identified by conversely asking a question "what can be changed by which participant."

Also, in conjunction with this, logic programming has a function called "back tracking." It is intended to seek every solution to a certain question. While the aforementioned goal execution can, if successful, seek a set of solutions, it is possible by utilizing the back tracking function to force the goal execution process to reverse (return to a state of one step before) and attempt another possibility. And consequently, all the solutions are sought by implementing every possible case.

Moreover, the word "relation" mentioned here is also referred to as "predicate." Hereafter, this word "predicate" is also used as a word for referring to a relation in logic programming.

FIG. 1 shows a system configuration of the present invention. Server 110 is connected to storage device 115 on which a database is stored. In addition, the server is connected via network 120 to terminal apparatus 130, 140, 150, . . . A flow control section that is a central component of the present invention exists on server 110, and documents are managed by this section. A document is stored on database 115 every time it is updated. While the diagram shows a server and a storage device (database) that are different in structure, it is also possible to integrate the server and storage device by storing the database on the storage device of the server. On the other hand, participants access server 110 through network 120 by utilizing terminal apparatus 130, 140, 150, . . . Here, for a client terminal apparatus, not only a computer apparatus but also a fixed telephone, a portable telephone or a portable PDA (personal data assistant) can be used. Furthermore, for a network, telephone lines, the Internet, LAN (local area network) and WAN (wide area network) and the like are thinkable.

Figure 2:
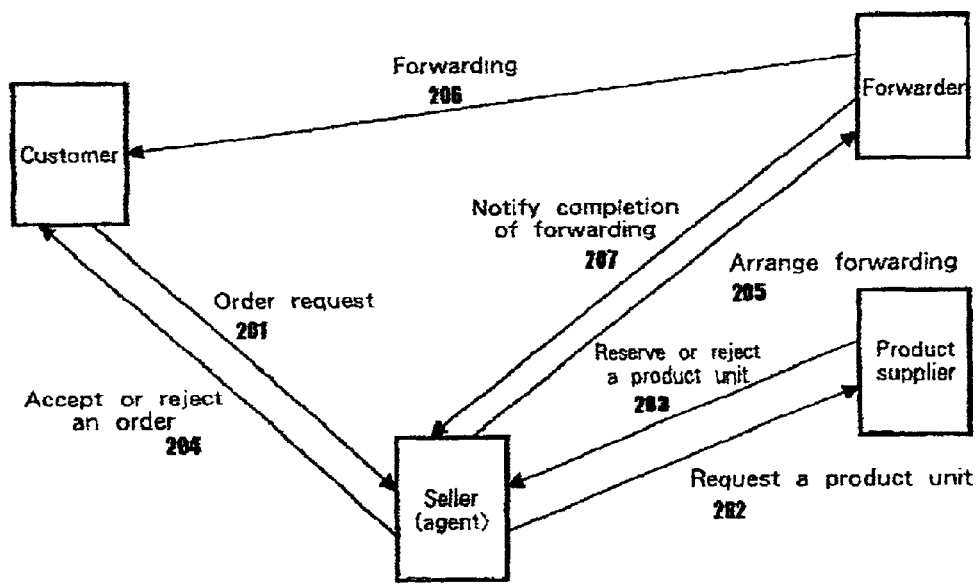
FIG. 2 is a diagram showing typical inter-company workflow that is a subject of the present invention.

How the present invention is implemented in the system configuration shown in this FIG. 1 is explained hereafter based on the workflow shown in FIG. 2. However, the present invention is not limited to such a workflow. As a customer makes an order request from terminal apparatus 130, server 110 of the seller generates a document on the order (a purchase order, for instance), and stores it on the database. And the server requests terminal apparatus 140 of a product supplier to reserve a specific product unit. And the server notifies terminal apparatus 130 of the customer of whether or not the order was accepted, and if the order was accepted and the product is to be forwarded, arranges forwarding with terminal apparatus 150 of a forwarder.

Subsequently, the forwarder advises terminal apparatus 130 of the customer of a forwarding date from terminal apparatus 150, and when the forwarding is completed, notifies server 110 of the seller of completion of processing.

On the other hand, if a customer cancels an order, for instance, necessary notice is given to a product supplier and a forwarder. Also, if shipment of products from a product supplier is to delay, a seller and a forwarder are notified thereof as required. In such a case, however, as cancellation or change of a forwarding date by the forwarder is necessary, a reset of the required field is notified of. In addition, if, for instance, a product supplier does not respond for a long time as to whether or not reservation of a product is acceptable, notifies of necessity of input.

And it is also an important characteristic of the present invention that it was implemented by using a technique of logic programming. It becomes possible thereby to change a workflow more flexibly than the conventional descriptive programming which describes every bit of a workflow.

Figure 3:
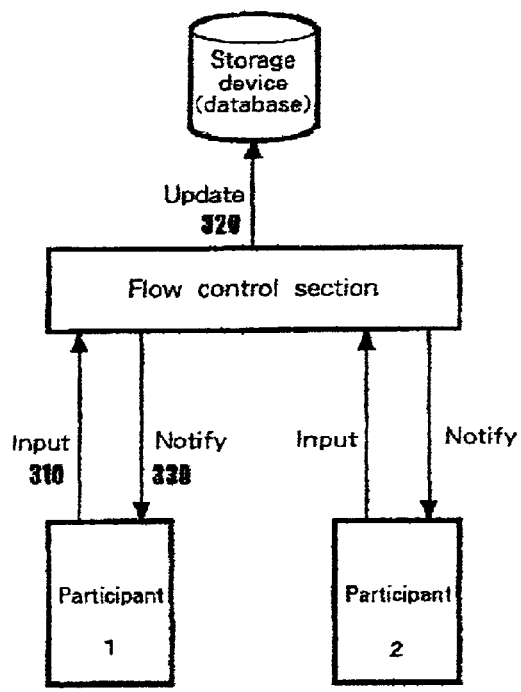
FIG. 3 is a diagram showing an overview of a workflow controlling system.

FIG. 3 shows an overview of the entire workflow controlling system having a flow control section that is a central component of the present invention. It is illustrated therein how a flow control section that is a central component of the present invention exchanges data with a terminal apparatus of a participant and a database containing documents. Participant 1 sends a prompt for a document from a terminal apparatus (310), and a flow control section verifies contents of the prompt and if no problem, updates a document on a database (320). Based on the results of updating the document, the flow control section then determines "who can do what," and "notifies" a subject participant via a terminal apparatus on that basis (330). As this system can cover a plurality of participants, another participant 2 can also operate likewise.

Figure 4:
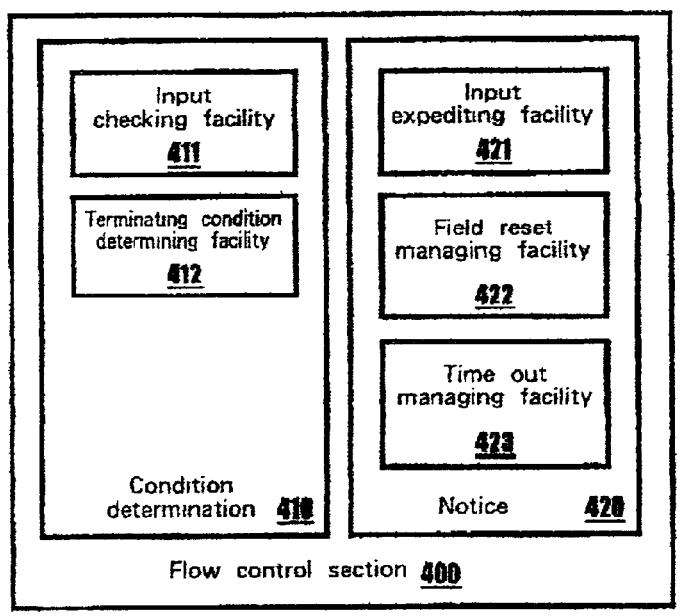
FIG. 4 is a diagram showing structure of a flow control section.

FIG. 4 shows components of a flow control section. Flow control section 400 comprises condition determining department 410 and notifying department 420. The condition determining department further comprises input checking facility 411 that determines a prompt from a participant and terminating condition determining facility 412 that determines whether or not a processing of a document is completed. The components of notifying department 420 are input expediting facility 421, field reset managing facility 422, and time out managing facility 423. Input expediting facility 421 provides a function, according to a state of a document, of identifying a participant who can input next and giving notice. Field reset managing facility 422 identifies, in the case that a field somewhere in a document is canceled, another field reset thereby and notifies participants filling the field. Time out managing facility 423 is aimed at handling time-related constraints, providing a function such as checking a certain constraint after a certain time. Namely, it performs a function of registering a constraint along with time-out time and generation of an event that triggers a check of the constraint. Moreover, these functions of the flow control section are implemented by executing them using a logic program based on a document including rules and data mentioned later.

Figure 5:
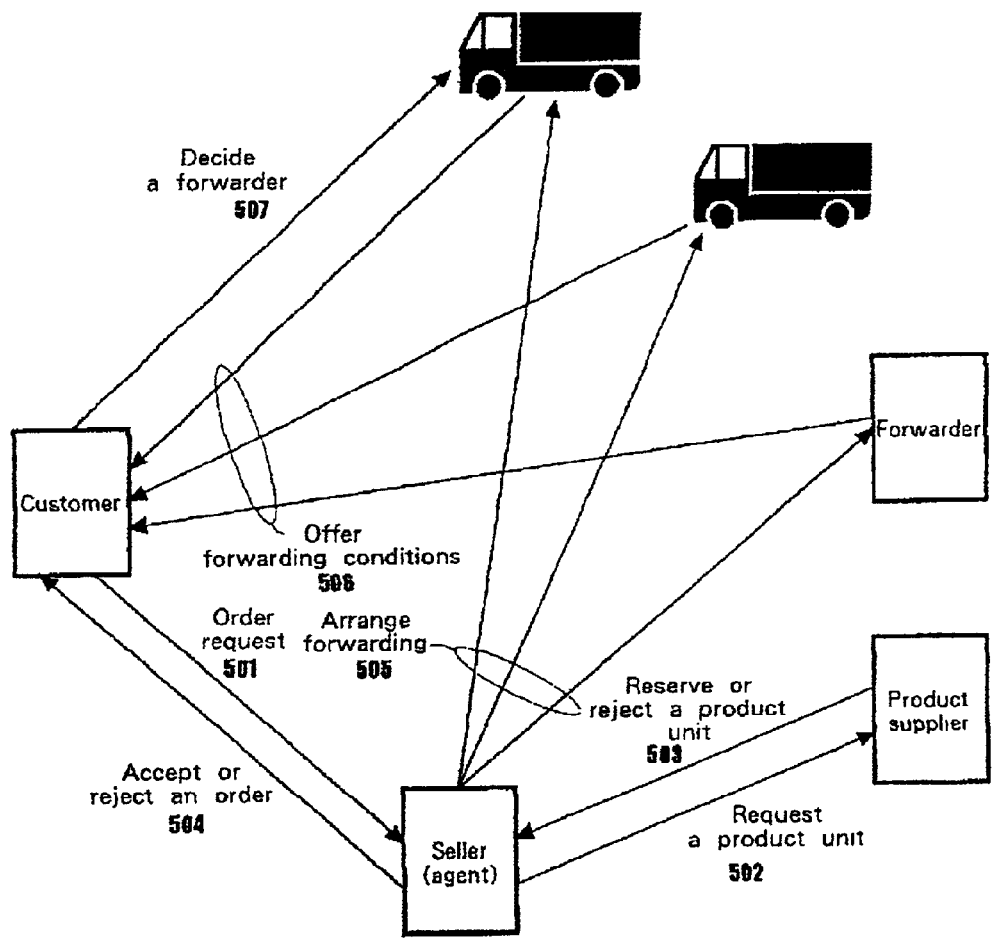
FIG. 5 is a diagram showing a workflow including a bid from a forwarder.

Hereafter, a flow of processing in an individual component is explained in detail. First of all, a workflow shown in FIG. 5 is assumed for concrete explanation. Here, according to an order request from a customer (501), a product supplier is requested to reserve a product unit (502), and in response to a notice of reservation or rejection of the product unit (503), notifies the customer thereof (504), and as to forwarding of the product unit to the customer, it is intended to have a plurality of forwarders compete with one another. Namely, the seller arranges forwarding with a plurality of forwarders (505), receives offers from the forwarders for a certain period of time (180 minutes) (506), and subsequently the customer selects a forwarder (507). Moreover, as long as the forwarder is not fixed, the customer can cancel the order and the forwarder can drop the offer.

4.2 Representation of a Document

Data structure of a document, namely a prerequisite to implementation of the invention is explained. The present invention describes a document not as mere data but logically as data including rules, and this document structure is explained hereafter. First, FIG. 6 shows how a document is structured. As shown here, a document consists of six parts. An overview of each part is as follows.

1. Contents: All the fields referred to and updated in one workflow are defined here. The structure has a tree structure, and the elements are nodes and options including values.
2. History: It is a record of what operations were performed to which field of Contents by whom and when, and a new record is added at every operation. It includes time, person, action and node ID.
3. Access Control: It is a description of access control for a field, represented as a rule. It is prescribed by using a subject field, a role or ID of an operator, a type of operation and time, and more specifically, as FIG. 6 shows, it includes a node ID, a tag name, a person, a role, action (operation) and a conditional expression. Action includes w (write), r (read), cr (create), cn (cancel) and dl (delete).
4. Constraints: It is a description of constraints on fields in Contents. It normally describes relations among the fields, and especially describes constraints on time by using records in History. It is indicated by a conditional expression.
5. Dependencies: It is a description of dependencies among the fields in Contents, and describes contents such as "a value can be entered in field B only after entering a value in field A." While Dependencies is a type of a constraint, it is differentiated since it plays an important role in generation of a flow, identification of impact caused by cancellation, etc. It includes a depended node ID and a dependent node ID.
6. Termination: It describes a terminating condition of a business process. Termination includes end and abort. It includes a type and a conditional expression.

As understood from the above explanation, among the components of a document, 3. Access Control to 6. Termination store not mere data but as data what is described as rules. These rules are interpreted by a determining facility mentioned later, and used to verify whether a document meets these rules. Namely, it becomes possible, by describing a document from data and rules so that the document is converted into a logic program and used on a server, to flexibly cope with change in a workflow. FIG. 7 specifically shows the six types of components in a document and a method of representation, which are explained here in detail. In this FIG. 7, field OrderID in Contents summarizes information of order numbers and Product summarizes information of products, comprising a product number (ProductID), price (Price) and desired forwarding date (DeliveryDateRequested). SupplierID is a number of a trader that is a product supplier, and UnitID is an actual product unit (object) number. Transport is information of forwarding, comprising a plurality of candidate forwarders (Candidate) and a finally decided forwarder (Specified) A candidate includes information of a forwarder number and possible forwarding date (DeliveryDateOffered).

A record in History part comprises time, a subject of operations (a person or a trader), a type of operation and an object of operations (field name). For instance, "14/Sep/1999:15:20:30, Runtime, w, OrderID" indicates that "'Runtime' performed writing to 'OrderID' at the time '14/Sep/1999:15:20:30'."

In Access Control part, "value(ConsumerID), w, Specified" indicates that "a person written in ConsumerID can write in 'Specified'," and "Transport, cr, Candidate#?, (value(Specified)=nil)" indicates that "a person having a role of 'Transport' can create 'Candidate#?' as long as nothing is written in 'Specified'."

In Constraints part, the first constraint indicates that "a forwarding date offered by a forwarder (DeliveryDateOffered) must be the same as or prior to a forwarding date requested by a customer (DeliveryDateRequested)." The second constraint means that the constraint relates to time and "Specified must be written within 180 minutes after 'DeliveryDateRequested' is written," indicating that a forwarder must be decided within 180 minutes of a customer's order.

Dependencies part indicates "to write in order of 'OrderID,' 'ConsumerID'" and "to write in order of 'DeliveryDateRequested,' 'Candidate#?'"

Termination part indicates that a business process "ends if 'Specified' is written," and "aborts in the case that 'ProductID' is canceled and in the case that 'Specified' is not written within 180 minutes after 'ProductID' is written."

This Termination part indicates a condition for ending and a condition for aborting. As a condition for ending, a case where a value of TransportSpecified is identified is represented. On the other hand, as conditions for aborting, a case where ProductID is canceled and a case that there is no offer from a forwarder within 180 minutes after ProductID is identified are described.

4.3 Implementing a Flow Control Section 4.3.1 Overview of Processing

Figure 8:
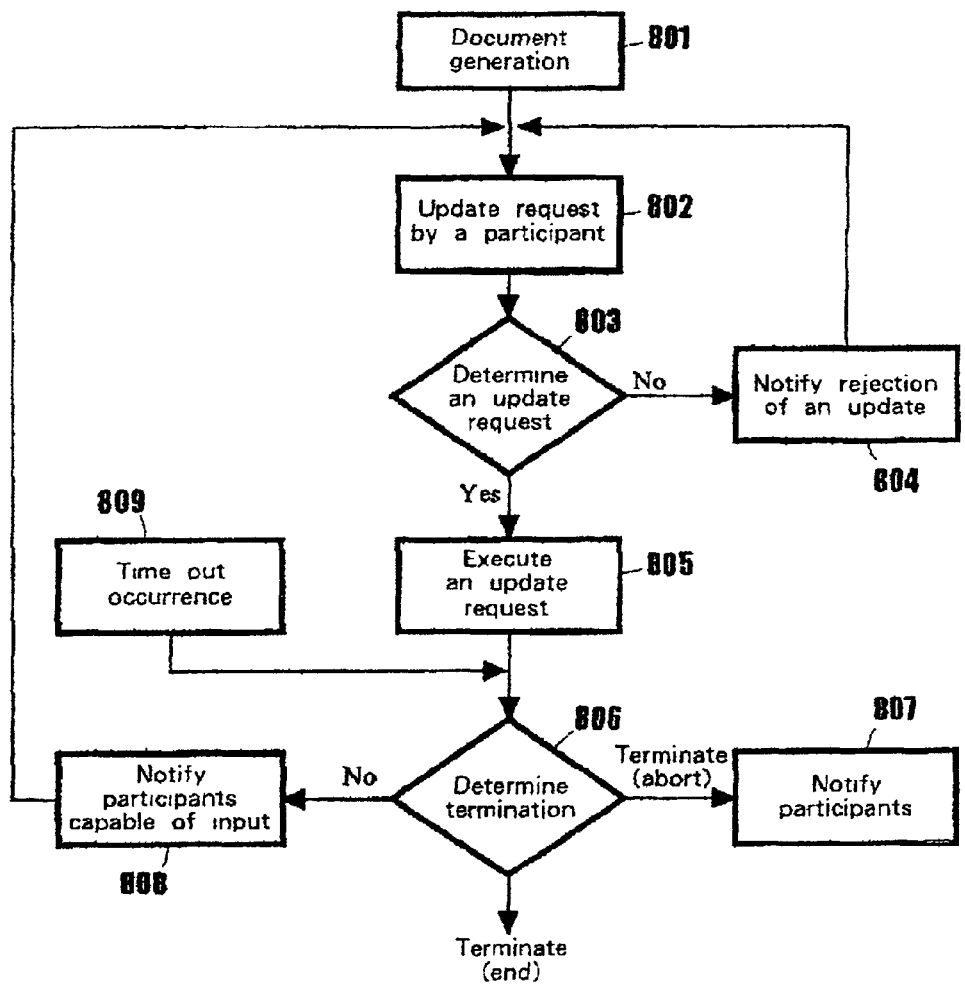
FIG. 8 is a diagram showing operation of a flow control section.

FIG. 8 shows an overview of a flow control section. First, a document shown in FIG. 6 and FIG. 7 is generated according to a request from a terminal apparatus of a certain participant (801). If a document is generated on a database, a request for an update on the document is received from a terminal apparatus of a participant (802), and it is determined whether or not the request is appropriate (803). And if it is not appropriate (in the case of no), it notifies via a terminal apparatus the participant who requested an update thereof (804). And if the update request is appropriate (in the case of yes), then it executes to update the document on the database (805). After such execution of a request for an update on a document, it determines whether processing of the document was completed or not, and whether it ended, aborted or is not yet completed (806). And if aborted, it notifies the participant thereof through a terminal apparatus (807). If not completed, then it identifies a participant who can update next and notifies the terminal apparatus thereof (808). On the other hand, when executing an update request, time out is also registered (it is mentioned later), and if the registered time out occurs (809), the registered constraints are verified and then it determines termination.

Figure 9:
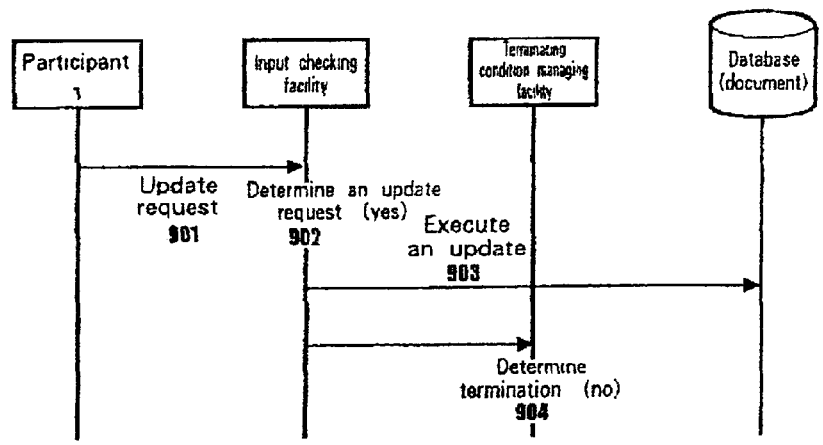
FIG. 9 is a diagram showing a processing flow among modules.
Figure 10:
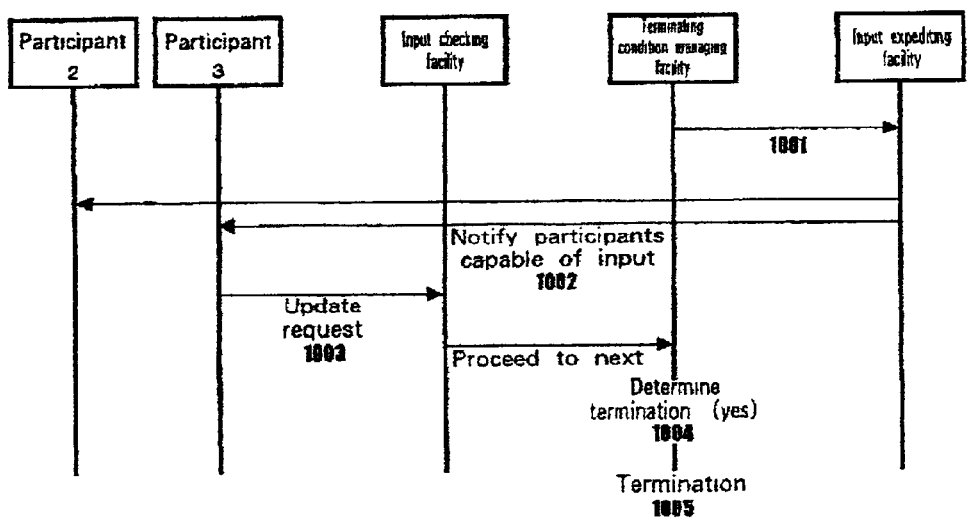
FIG. 10 is a diagram showing a processing flow among modules.

FIG. 9 and FIG. 10 show how a flow of an update request is processed by the components. For a document generated according to a request from a certain participant, participant 1 sends an update request (901 of FIG. 9), which is sent to an input checking facility then determining whether the update request is appropriate or not (902). If the request is appropriate, then it actually updates the document (903), and thereafter the control shifts to a terminating condition managing facility, where terminating conditions are determined (904). Or, if not completed, the control shifts to an input expediting facility (1001 of FIG. 10), and it identifies a participant capable of inputting next and notifies the participants of necessity of input (1002). One of the notified participants sends a next update request (1003), goes through a check of the request, execution of it and so on, and then the terminating condition managing facility determines termination (1004), and thus the processing of this document is completed (1005).

4.3.2 Internal Representation of a Document

This specification describes a case where a document is implemented based on a frame of logic programming. It is because a back tracking function in logic programming is important in implementing the present invention. However, the present invention is not limited to this, and as anyone in this industry can easily understand, another inference facility providing a back tracking function, a rule based system having a back tracking inference function for instance, can also be utilized to implement the present invention. Hereafter, a method of internal representation of a document is detailed based on a frame of logic programming, by way of example.

(1) Contents

Figure 11:
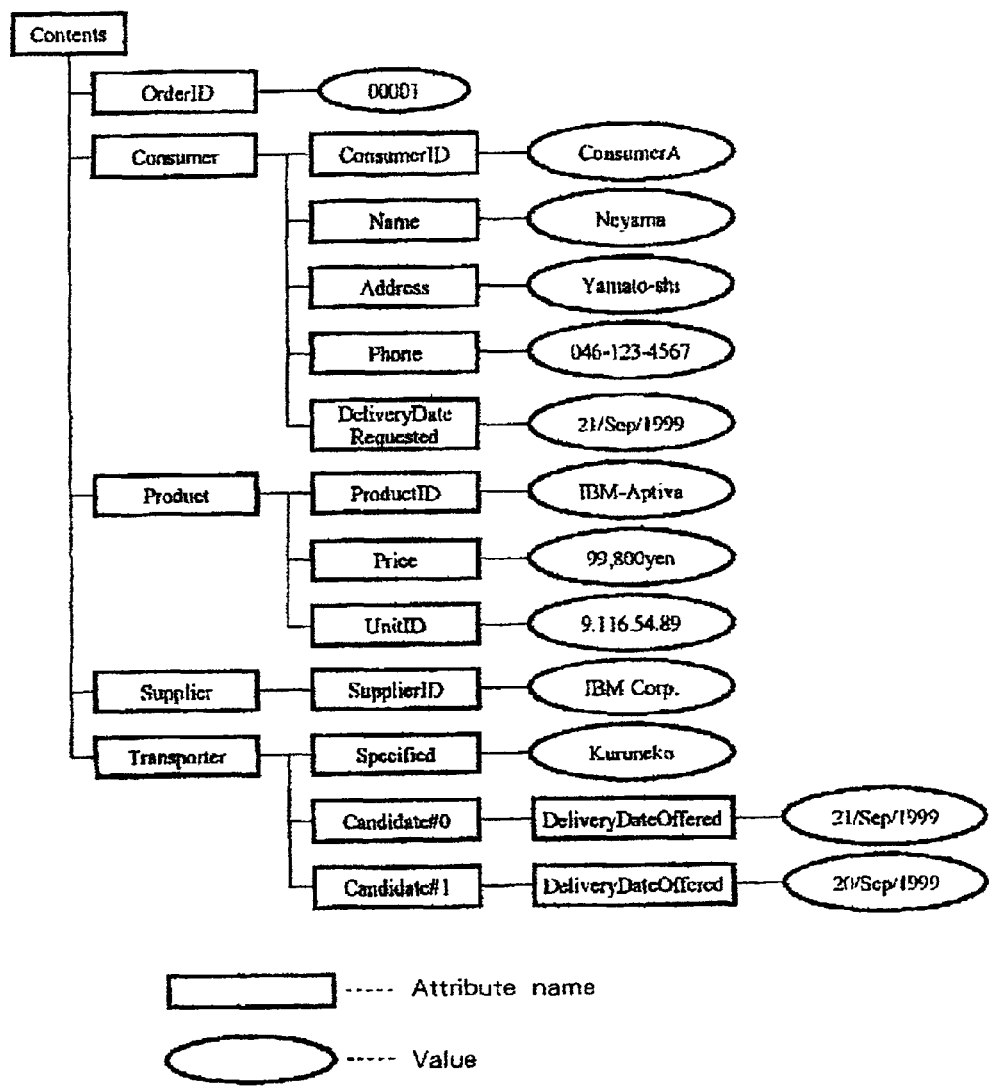
FIG. 11 is a diagram showing structure of contents.

Contents are represented as a set of tuples. A tuple is n sets of data where each argument corresponds to a specific attribute. As FIG. 11 shows, while Contents are represented as a tree structure, tabular representation of this is used for internal representation (FIG. 12). In FIG. 11, each node represents an attribute, and what is represented as an ellipse at a leaf part is representing a value. On the other hand, each string in the tabular representation of FIG. 12 is a tuple, and in this case, it is a tuple of 4 arguments. The first argument shows a node ID, which is unique to each field and automatically allocated by the system. As a document has a tree structure capable of representing its node position by a path from a route, the second argument means a path of the node, and the third argument shows a parent node of the node. The fourth argument is a value of a node (field), and nil means a state where nothing is in it. The example here represents a state immediately after Consumer information is inputted.

(2) History

FIG. 13 represents history and a tuple has 5 arguments. The first argument represents order, the second argument represents time, the third argument is an ID of a participant who performed an operation, and the fourth argument represents the operation. The fifth argument is a node ID.

Moreover, the description here consists of some excerpts since it becomes enormous to describe all.

(3) Access Control

While FIG. 14 represents Access Control, a rule is represented. A rule is represented in the following format, which means that, if a condition part holds, a conclusion part holds.

Conclusion part←condition part

A conclusion part is represented as a predicate of 3 arguments, access(<node>, <user>, <operation>) means that user is capable of operation to node. For instance, rule 1 means that, if a subject node's path is "/document" and a user's role is "consumer," a write operation is possible (+w). Also, rule 2 means that, if a subject node's path is "/ProductID," and a user's role is "Customer," and a creator of the node is a subject user (?User), a write operation is possible (+w). Moreover, a variable is represented in the format of ?XXXX in the rules.

(4) Constraints

As FIG. 15 shows, a constraint is represented by a condition part without a conclusion part. For instance, constraint 1 is a constraint related to CompanyID that TransportSpecified belongs to. "Contents" of constraint 1 indicates being under a restriction that CompanyID of a specified forwarder (TransportSpecified) must be included in a predetermined Member, while "Internal representation" represents a logic program for implementing it. Constraint 2 is represented as a relation between DeliveryDateRequested and DeliveryDateOffered.

(5) Dependencies

As FIG. 16 shows, Dependencies are represented as a relation between fields, namely as a tuple of 2 arguments. It means that, only when the first argument's node value is identified, the second argument's node value can be inputted. To implement this, an interpreting facility is separately required, which is mentioned later.

(6) Termination

Figure 17:
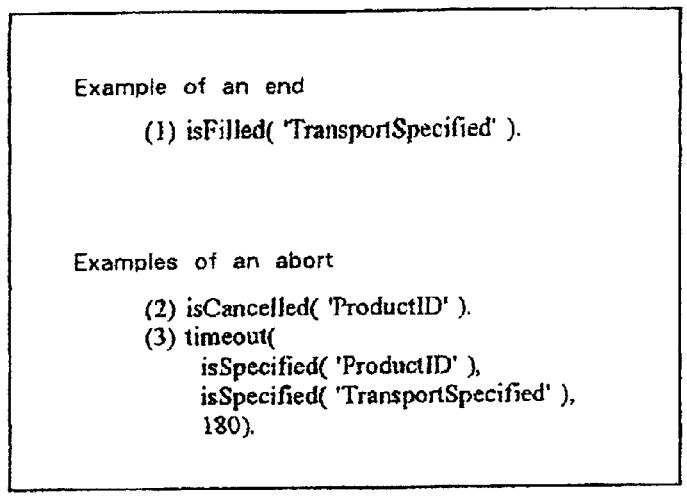
FIG. 17 is a diagram showing an example of Termination representation.

Termination can be largely divided into end and abort. In FIG. 17, three terminating conditions are further described. In (1), it is described that, if TransportSpecified is identified, it is an end. In (2), it is described that, if ProductID is canceled, it is an abort. And in (3), it is described that TransportSpecified must be identified within 180 minutes after ProductID is identified. And timeout, a predicate here, is an expression adopted for the purpose of not only checking the conditions but also using it for a notification mentioned later.

4.3.3 Input Checking Facility

While using the descriptions in the preceding paragraph, how an update request is checked. For instance, suppose a customer identifies a product and a product supplier makes an update request that identifies a Unit ID. In this case, the input checking facility checks whether or not the update request is appropriate as to each of Access Control, Constraints and Dependencies. Such checking facilities are defined by utilizing a frame of logic programming respectively, and the checking facilities themselves are represented as rules. As for Access Control, as FIG. 14 shows, allow, a predicate here for evaluating whether participant X can update a field of tag T is defined as follows.

Allow(?Node, ?Who, 'w')←Describe conditions which are updatable.

And it applies allow('/ud:document/ud:contents/Product/UnitID', 'Yamada', 'w') to every rule, and determines it as updatable if any of them is true.

Here, execution of a goal is explained based on the above goal and rule 1 of FIG. 14. Execution of a goal is implemented by matching a given goal with a conclusion part of a pre-registered rule to materialize the rule. Namely, it is a concept to determine that, as a result of materialization, if a condition part is true, then a conclusion part is also true, and thus a given goal is also true. In the above example, it means to execute a goal, allow('/ud:document/ud:contents/Product/UnitID', 'Yamada', 'w'), and in this case, the rule itself is materialized as follows by matching the conclusion part of rule 1 of FIG. 14 with the goal.

allow('/ud:document/ud:contents/Product/UnitID', 'Yamada', 'w')←isPath ('/ud:document/ud:contents/Product/UnitID', "/document" and hasRole('Yamada', "Consumer").

In this, by matching the goal with the conclusion part, variable ?Node becomes '/ud:document/ud:contents/Product/UnitID' and ? Who becomes 'Yamada', and so the condition part is also materialized likewise. Here, isPath in the condition part is true for these arguments, and on the other hand, hasRole is also true for these arguments, so it can be determined that the condition part is also true. Thus, the goal is also true.

As for constraints, by way of example, a case where Kuroneko, a forwarder made an update request that it wants to enter a value of Oct. 10, 1999 in DeliveryDateOffered as a date of offering. In this case, the flow control section "temporarily" accepts this request and updates the contents, and then verifies whether the constraints are met by the new contents. In this case, if constraint 1 of FIG. 15 is evaluated, DeliveryDateRequested is Oct. 10, 1999 and so the result of evaluating this condition is true. In case of success, the temporary contents are formally adopted, and in case of failure, they are rejected.

Concerning dependencies, the same example as aforementioned is considered. In this case, a predicate, satisfyDependency is prepared, which determines whether or not a node is updatable from a viewpoint of dependencies.

SatisfyDependency(?Node)←depend(?Node, ?Dependson) and isFilledAll(?DependsOn).

depend(Node, List). List of nodes required for updating % Node . . .

Here, depend, a predicate, is a predicate representation of FIG. 16. To determine whether UnitID is updatable, SatisfyDependency('/ud:document/ud:contents/Product/UnitID') should be evaluated, and if true, it is updatable.

As mentioned above, an input checking facility can verify appropriateness of an update request by checking the three of Access Control, Constraints and Dependencies.

4.3.4 Determining Terminating Conditions

Determination of terminating conditions is described. As for an end, the following predicate, checkEnd, is prepared in order to check a terminating condition defined by endCondition.

CheckEnd(?Cond)←?Cond=isFilled(?Tag) and getvalue(?Tag, ?V) and ?V !=nill.

Figure 18:
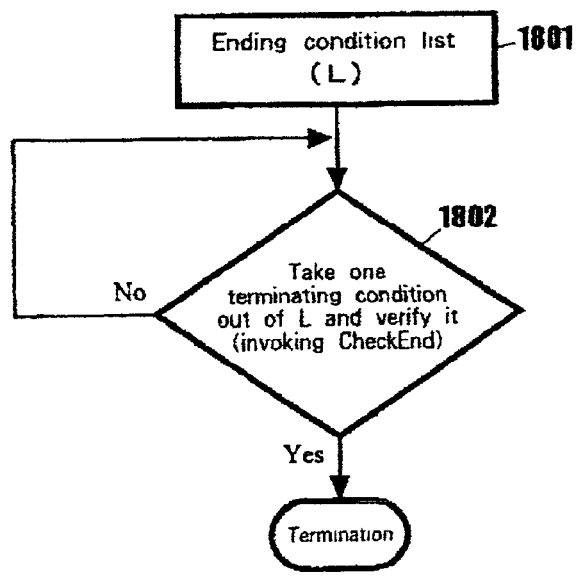
FIG. 18 is a diagram showing end determination.

This is used in the case of a condition in which it terminates if a value of a certain field is identified. CheckEnd must be invoked to every terminating condition that is defined, and a flow therefor is as in FIG. 18. For ending condition list (L) (1801), one terminating condition is taken out and verified by invoking CheckEnd (1802). If the condition is met (Yes), it is terminated, and if not (No), another condition is verified.

Moreover, concerning an abort, a predicate, checkAbort is defined as follows, for a case where a field is canceled and for determining time out.

CheckAbort(?Cond)←?Cond=isCancelled(?Tag) and event(?Time, ?Who, "cn", ?Tag).

Figure 19:
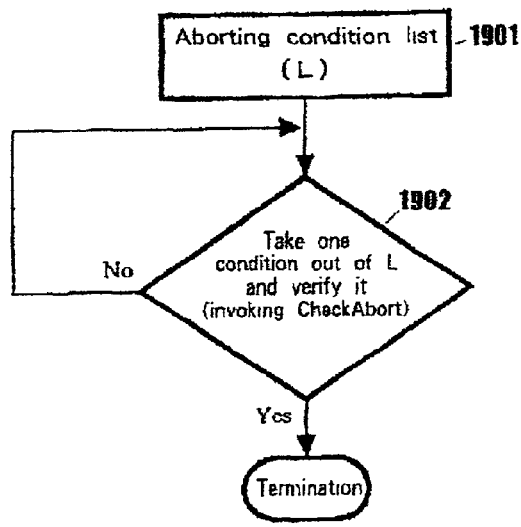
FIG. 19 is a diagram showing abort determination.

This corresponds to abort (2) of FIG. 17. In this case, if ProductID is canceled, checkAbort becomes successful and can determine it as an abort. CheckAbort must also be invoked to every aborting condition, and a processing flow is as in FIG. 19. For ending condition list (L) (1901), one terminating condition is taken out and verified by invoking CheckAbort (1902). If the condition is met (Yes), it is terminated, and if not (No), another condition is verified.

4.3.5 Input Expediting Facility

The role of this facility is to identify who can update which field based on Access Control and Dependencies and notify the participants. Another example explains a case where every argument is specific, wherein an object is to determine appropriateness of input by a true or false value of a goal, and as to implementation of this notifying function, an object is to find out specific values such as "who" or "where" by giving a variable to an argument of the goal (allow). More specifically, from a viewpoint of Access Control, allow(?Node, ?Who, 'w') can be executed to acquire an answer in the form that a node and a participant are assigned to a variable, and pairs of an updatable node and a participant can be acquired one after another by further utilizing the back tracking function of a logic programming. If this is utilized and the following goal is executed by using findall, a built-in predicate, a list of pairs of a node and a participant is assigned to List.

findall([?Who, ?Node], allow(?Node, ?Who, 'w'), ?List)

In this case, [?Who, ?Node] is a variable as well as a goal including a variable, and so it can be executed to acquire a specific value to be assigned to the variable. In this case, a pair of a person and a subject node is acquired as a list.

Likewise, a node updatable from a viewpoint of Dependencies can be acquired by satisfyDependency(N). Accordingly, if what meets both allow and satisfyDependency is acquired, a participant to whom an update notice is to be issued next and a field that the participant can update can be acquired. A rule meeting such a requirement can be defined as follows.

CanWrite(?X, ?Node)←allow(?Node, ?X, 'w') and satisfyDependency(?Node).

And if the following goal is executed, pairs of a node and a participant can be acquired.

findall([?Node, ?Who, ], canWrite(?Who, ?Node), ?List)

For instance, if this goal is executed when a document is newly created, the following response is acquired.

| Participant | Node |
|---|---|
| 'Nakamura' | '/ud:document/ud:contents/Consumer/ConsumerID' |
| 'Seki' | '/ud:document/ud:contents/Consumer/ConsumerID' |
| 'Nakamura' | '/ud:document/ud:contents/Consumer/Name' |
| 'Nakamura' | '/ud:document/ud:contents/Consumer/Phone' |
| 'Seki' | '/ud:document/ud:contents/Consumer/Phone' |

Figure 20:
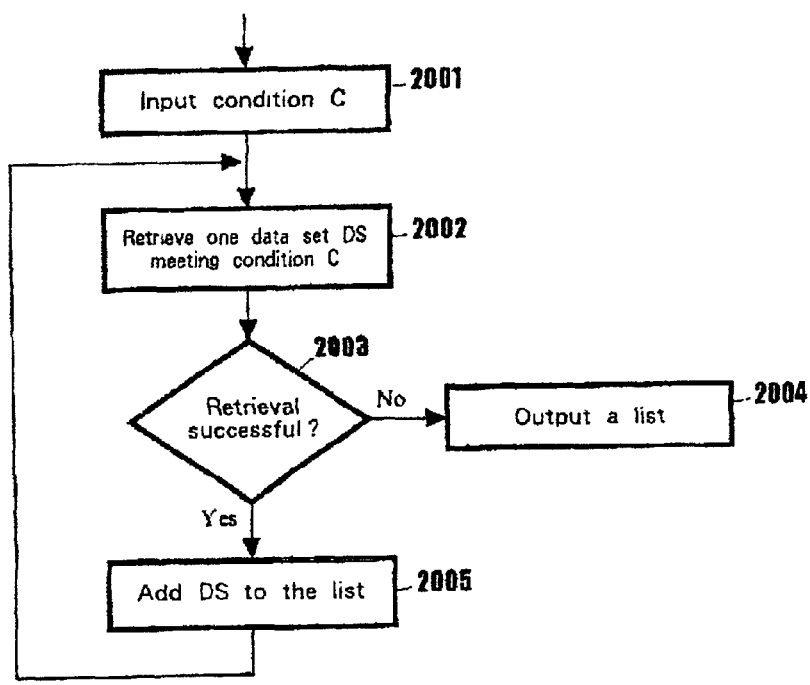
FIG. 20 is a diagram showing processing for finding all elements.

This means that both Nakamura and Seki who are consumers can update the fields such as ConsumerID, Name and Phone. For reference purposes, an overview of processing of findall, a predicate, is shown in FIG. 20.

4.3.6 Details of Execution of an Update Request

Figure 21:
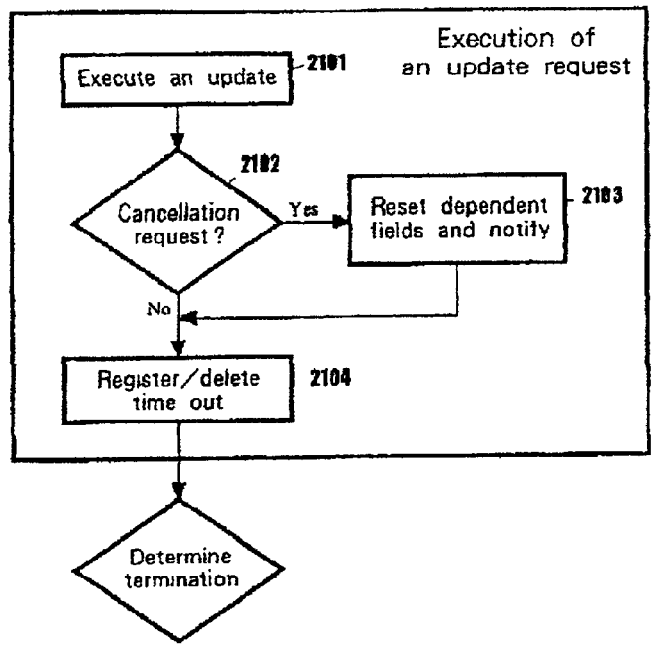
FIG. 21 is a diagram showing details of execution of an update request.

Details of execution of an update request are shown in FIG. 21. First, a document is updated (2101), and two kinds of post-processing are successively performed thereafter. First, it is determined whether or not it is a cancellation request, and if yes, a field to be reset by cancellation of a subject field is identified, and the field is reset and a participant who wrote in the field is notified that the field is reset (2103). Next, constraints related to time out are registered and deleted (2104), and then terminating conditions are determined.

Figure 22:
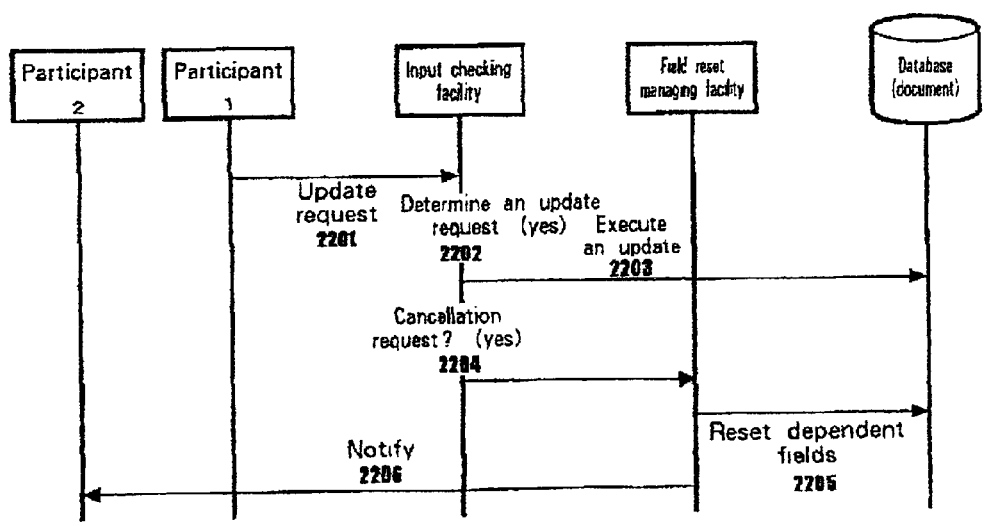
FIG. 22 is a diagram showing details of processing of an update request.

FIG. 22 shows how an input checking facility and a field reset managing facility cooperate in an execution process of an update request. If an update request (2201) is appropriate as a cancellation request (2202), a document is updated (2203), and thereafter, in the case of a cancellation request (2204), control shifts to a field reset managing facility. The field reset managing facility resets a related field and updates a document (2205). Furthermore, it notifies participants of a field reset (2206). Thereafter, control shifts to a time out managing facility, which is omitted here.

4.3.7 Notifying Facility Based on Cancellation

There are also cases where, if a field is canceled, other fields must also be reset. As in FIG. 22, in this case, related participants (namely, participants who wrote in the canceled field and any field dependent on it) are notified that the field was reset. This is determined based on dependencies. For instance, to check who must be notified when a node is canceled, dependent nodes can be sought as in FIG. 23 and thereafter the participants who wrote in each node can be identified.

Figure 23:
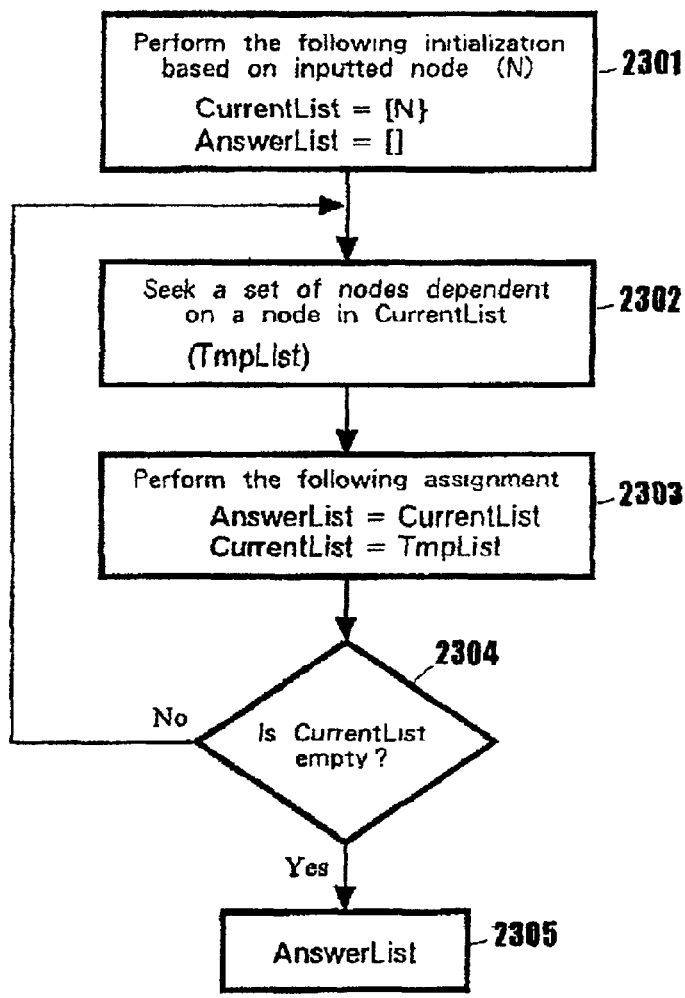
FIG. 23 is a diagram showing processing for finding dependent nodes.

In FIG. 23, predetermined initialization (2301) is performed on a node given first, and then a set of nodes dependent on that node are found out (2302) and predetermined assignment is performed (2303). It is determined whether CurrentList is empty or not (2304), and if no, it is recursively repeated until finally all dependent nodes are found out. If CurrentList becomes empty, AnswerList is acquired (2305).

Furthermore, it can be found out by history information as to who have written in the nodes thus found out.

If any of the nodes is canceled when the process has progressed to an extent, the persons who wrote in the node itself and other nodes dependent on it are to be notified. For instance, if a customer cancels an order after a product supplier determines a product unit ID and a few forwarders bid, the supplier and forwarders are notified. In this example, if the process of FIG. 23 is executed by inputting ProductID, and further the participants to be notified of cancellation are searched from history, 'Runtime,' 'Nakamura,' 'FedEx' and 'Kuroneko' can be found out.

This represents that, if the node ProductID is canceled, 'Runtime,' 'Nakamura,' 'FedEx' and 'Kuroneko' (namely, all the users related to this document) must be notified thereof.

4.3.8 Time Out Managing Facility

Figure 24:
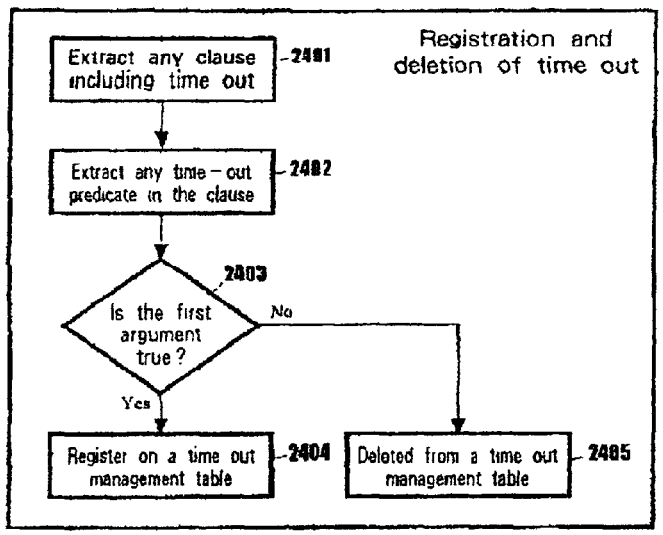
FIG. 24 is a diagram showing details of registration and deletion of time out.

FIG. 24 shows an overview of registration and deletion of time out. First, any clause including a time-out predicate is extracted from constraints (2401), and any time-out predicate portion in the clause is extracted (2402). A time-out predicate is in a form such as timeout(G1, G2, Interval), meaning that G1 becomes true and then Interval hours thereafter, G2 must become true. This requires that true/false of G1 is checked and registration/deletion of time out is updated every time a document is updated. This is reflected in FIG. 24, and true/false of the first argument is checked (2403) so that it is added to a management table if true (2404), and deleted from a management table if false (2405).

Figure 25:
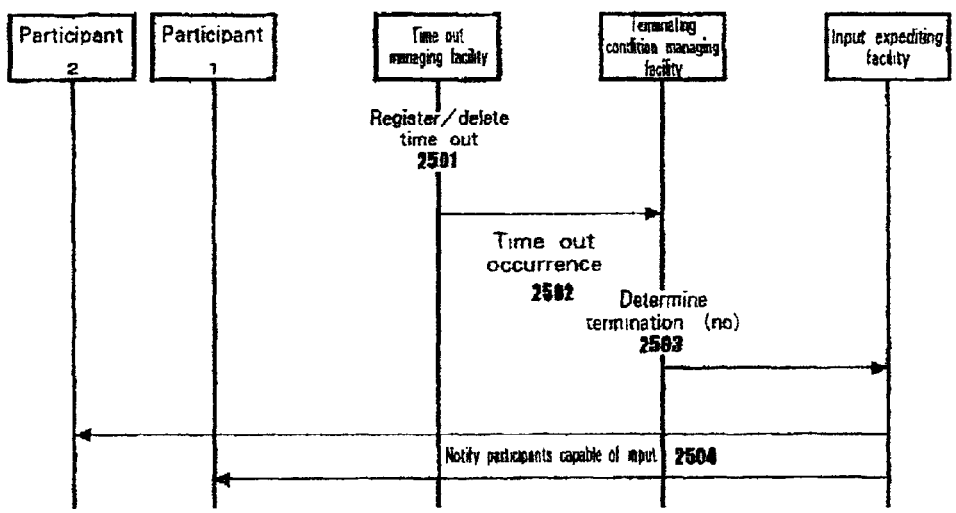
FIG. 25 is a diagram showing processing after time out registration and occurrence.

FIG. 25 shows a process in the cases of time out registration/deletion and time out occurrence. For instance, in the following aborting condition in (3) of FIG. 17, it is registered when ProductID is identified and time out occurs 180 minutes thereafter.

Timeout(isSpecified('ProductID'), isSpecified('TransportSpecified'), 180).

As FIG. 25 shows, after time out registration/deletion (2501), terminating conditions are determined (2503) according to time out occurrence (2502), and if TransportSpecified is not specified, the entire process aborts. On the other hand, if specified, control shifts to the input expediting facility, and a next expediting notice is issued (2504).

The present invention can provide a new means of flow control for a workflow controlling system wherein a business document flows among a plurality of participants.

In addition, it can provide a workflow controlling system and the like not only supporting a fixed workflow but also capable of flexibly handling any change in a workflow.

Moreover, it can also provide a facility for appropriately notifying participants of necessity of input according to a state of a document.

Furthermore, in the case that a request is canceled, it can notify a field reset caused thereby so that an appropriate process is subsequently executed.

What is claimed is:

1. In a system which includes a server apparatus including a storage device and a plurality of terminal apparatus connecting to said server apparatus via a network, a method for controlling a workflow/process which is executed by said server, comprising the steps of:
   (a) generating a document which includes data and rules responding to a request from one of said terminal apparatus and storing it in said storage device;
   (b) receiving an update request on said document from the first terminal apparatus, determining whether said update request is appropriate or not, and if said update request is appropriate then executing the update on said document;
   (c) determining whether said workflow/process was completed or not, and if not completed then identifying a second terminal apparatus which can update next and notifying said second terminal apparatus;
   (d) converting said document into a logic program; and
   (e) implementing said steps (b) and (c) on said server apparatus, by excuting said logic program.

2. The method according to claim 1 wherein said step (b) further comprises a step of determining whether or not said update request is a cancellation request, and if it is, resetting any field of said document related to the cancellation request, and identifying a terminal apparatus related to the reset field to notify it.

3. The method according to claim 1 wherein said step (b) further comprises a step of, if the update request is not appropriate, notifying the first terminal apparatus.

4. The method according to claim 1 wherein said Step (b) further comprises a step of registering the time determined to be time out when executing the update request, and if time out occurs, giving predetermined notice to related terminal apparatus.

5. The method according to claim 1 wherein said step (c) further comprises a step of, if it is determined that the workflow/process ended abnormally, notifying the terminal apparatus.

6. In a system which includes a server apparatus and terminal apparatus connecting to said server apparatus via a network, a method for controlling a workflow which is executed by said server, comprising the steps of:
   (a) generating a document which includes data and rules responding to a request from said terminal apparatus and storing it;
   (b) receiving an update request on said document from the first terminal apparatus, determining whether said update request is appropriate or not, and if said update request is appropriate then executing the update on said document on a storage medium;
   c) determining whether or not said update request is a cancellation request, and if it is, resetting any field related to the cancellation request, and identifying a terminal apparatus related to the reset field to notify it;
   (d) converting said document into a logic program; and
   (e) implementing said method on said server apparatus, by executing said logic program.

7. The method according to claim 6 wherein said step (b) further comprises a step of, if the update request is not appropriate, notifying the first terminal apparatus.

8. The method according to claim 6 wherein said step (b) further comprises a step of registering the time determined to be time out when executing the update request, and if time out occurs, giving predetermined notice to related terminal apparatus.

9. In a system which includes a server apparatus including a storage device and a flow control section and terminal apparatus connecting to said server apparatus via a network, said flow control section executing workflow controlling functions of:
   (a) generating a document which includes data and rules responding to a request from said terminal apparatus and storing it in a storage device;
   (b) receiving an update request on said document from the first terminal apparatus, determining whether said update request is appropriate or not, and if said update request is appropriate then executing the update on said document on a database;
   (c) determining whether processing of said document was completed or not, and if not completed then identifying a second terminal apparatus which can update next and notifying said second terminal apparatus;
   (d) converting said document into a logic program; and
   (e) implementing said functions of said flow control section in said flow control section, by executing said logic program.

10. The system according to claim 9 wherein, in said (b), said flow control section further has a function of determining whether or not said update request is a cancellation request, and if it is, resetting any field of said document related to the cancellation request, and identifying a terminal apparatus related to the reset field to notify it.

11. The system according to claim 9 wherein, in said (b), said flow control section further has a function of, if the update request is not appropriate, notifying the first terminal apparatus.

12. The system according to claim 9 wherein, in said (c), said flow control section further has a function of registering the time determined to be time out when executing the update request, and if time out occurs, giving predetermined notice to related terminal apparatus.

13. The system according to claim 9 wherein, in said (c), said flow control section further has a function of, if it is determined that the processing ended abnormally, notifying the terminal apparatus.

14. In a system which includes a server apparatus including a storage device and a flow control section and terminal apparatus connecting to said server apparatus via a network, said flow control section having workflow controlling functions of;
  (a) generating a document which includes data and rules responding to a request from said terminal apparatus and storing it in a storage device;
  (b) receiving an update request on said document from the first terminal apparatus, determining whether said update request is appropriate or not, and if said update request is appropriate then executing the update on said document on a database;
  (c) determining whether or not said update request is a cancellation request, and if it is, resetting any field related to the cancellation request, and identifying a terminal apparatus related to the reset field to notify said terminal apparatus;
  (d) converting said document into a logic program; and
  (e) implementing said functions of said flow control section in said flow control section, by executing said logic program.

15. The system according to claim 14 wherein, in said (b), said flow control section further has a function of, if the update request is not appropriate, notifying the first terminal apparatus.

16. The system according to claim 14 wherein, in said (b), said flow control section further has a function of registering the time determined to be time out when executing the update request, and if time out occurs, giving predetermined notice to related terminal apparatus.

17. In a system which includes a server apparatus including a storage device and terminal apparatus connecting to said server apparatus via a network, a computer readable storage medium storing a program used on said server for controlling a workflow, said program having said server execute the functions of:
  (a) generating a document which includes data and rules responding to a request from said terminal apparatus and storing it in a storage device;
  (b) receiving an update request on said document from the first terminal apparatus, determining whether said update request is appropriate or not, and if said update request is appropriate then executing the update on said document on a database;
  (c) determining whether processing of said document was completed or not, and if not completed then identifying a second terminal apparatus which can update next and notifying said second terminal apparatus;
  (d) converting said document into a logic program; and
  (e) implementing said functions by executing said logic program.

18. The storage medium according to claim 17 wherein, in said (b), said program further has said server execute a function of determining whether or not said update request is a cancellation request, and if it is, resetting any field of said document related to the cancellation request, and identifying a terminal apparatus related to the reset field to notify it.

19. The storage medium according to claim 17 wherein, in said (b), said program further has said server execute a function of, if the update request is not appropriate, notifying the first terminal apparatus.

20. The storage medium according to claim 17 wherein, in said (b), said program further has said server execute a function of registering the time determined to be time out when executing the update request, and if time out occurs, giving predetermined notice to related terminal apparatus.

21. The storage medium according to claim 17 wherein, in said (c), said program further has said server execute a function of, if it is determined that the processing ended abnormally, notifying the terminal apparatus.

22. In a system which includes a server apparatus including a storage device and terminal apparatus connecting to said server apparatus via a network, a computer readable storage medium storing a program used on said server for controlling a workflow, said program having said server execute the functions of:
  (a) generating a document which includes data and rules responding to a request from said terminal apparatus and storing it in a storage device;
  (b) receiving an update request on said document from the first terminal apparatus, determining whether said update request is appropriate or not, and if said update request is appropriate then executing the update on said document on a database;
  (c) determining whether or not said update request is a cancellation request, and if it is, resetting any field related to the cancellation request, and identifying a terminal apparatus related to the reset field to notify said terminal apparatus; and
  (d) using said program to convert said document into a logic program; and
  (e) executing said logic program.

23. The storage medium according to claim 22 wherein, in said (b), said program further has said server execute a function of, if the update request is not appropriate, notifying the first terminal apparatus.

24. The storage medium according to claim 22 wherein, in said (b), said program further has said server execute a function of registering the time determined to be time out when executing the update request, and if time out occurs, giving predetermined notice to related terminal apparatus.

25. A server apparatus including a storage device and a flow control section connecting to terminal apparatus via a network, said flow control section executing the workflow controlling functions of:
  (a) generating a document which includes data and rules responding to a request from said terminal apparatus and storing it in a storage device;
  (b) receiving an update request on said document from the first terminal apparatus, determining whether said update request is appropriate or not, and if said update request is appropriate then executing the update on said document on a database;
  (c) determining whether processing of said document was completed or not, and if not completed then identifying the second terminal apparatus which can update next and notifying said second terminal apparatus;
  (d) converting said document into a logic program; and
  (e) implementing said functions in said flow control section, by executing said logic program.

26. The server apparatus according to claim 25 wherein, in said (b), said flow control section further has a function of determining whether or not said update request is a cancellation request, and if it is, resetting any field of said document related to the cancellation request, and identifying a terminal apparatus related to the reset field to notify it.

27. The server apparatus according to claim 25 wherein, in said (b), said flow control section further has a function of, if the update request is not appropriate, notifying the first terminal apparatus.

28. The server apparatus according to claim 25 wherein, in said (b), said flow control section further has a function of registering the time determined to be time out when executing the update request, and if time out occurs, giving predetermined notice to related terminal apparatus.

29. The server apparatus according to claim 25 wherein, in said (c), said flow control section further has a function of, if it is determined that the processing ended abnormally, notifying the terminal apparatus.

30. A server apparatus including a storage device and a flow control section connecting to terminal apparatus via a network, said flow control section executing the workflow controlling functions of:
- (a) generating a document which includes data and rules responding to a request from said terminal apparatus and storing it in a storage device;
- (b) receiving an update request on said document from the first terminal apparatus, determining whether said update request is appropriate or not, and if said update request is appropriate then executing the update on said document on a database;
- (c) determining whether or not said update request is a cancellation request, and if it is, resetting any field related to the cancellation request, and identifying a terminal apparatus related to the reset field to notify said terminal apparatus;
- (d) converting said document into a logic program; and
- (e) implementing said functions of said flow control section in said, flow control section, by executing said logic program.

31. The server apparatus according to claim 30 wherein, in said (b), said flow control section further has a function of, if the update request is not appropriate, notifying the first terminal apparatus.

32. The server apparatus according to claim 30 wherein, in said (b), said flow control section further has a function of registering the time determined to be time out when executing the update request, and if time out occurs, giving predetermined notice to related terminal apparatus.

33. A server apparatus including a storage device and a flow control section connecting to terminal apparatus via a network, said flow control section having the means of:
- (a) generating a document which includes data and rules responding to a request from said terminal apparatus and storing it in a storage device;
- (b) receiving an update request on said document from the first terminal apparatus, determining whether said update request is appropriate or not, and if said update request is appropriate then executing the update on said document on a database;
- (c) determining whether processing of said document was completed or not, and if not completed then identifying the second terminal apparatus which can update next and notifying said second terminal apparatus;
- (d) converting said document into a logic program; and
- (e) implementing said means in said flow control section by means for executing said logic program.

34. A server apparatus including a storage device and a flow control section connecting to terminal apparatus via a network, said flow control section having the means of:
- (a) generating a document which includes data and rules responding to a request from said terminal apparatus and storing it in a storage device;
- (b) receiving an update request on said document from the first terminal apparatus, determining whether said update request is appropriate or not, and if said update request is appropriate then executing the update on said document on a database;
- (c) determining whether or not said update request is a cancellation request, and if it is, resetting any field related to the cancellation request, and identifying a terminal apparatus related to the reset field to notify said terminal apparatus;
- (d) converting said document into a logic program; and
- (e) implementing said means in said flow control section, by means for executing said logic program.

* * * * *